April 12, 1932.  L. G. BATES ET AL  1,853,843
APPARATUS FOR AND METHOD OF FEEDING MOLTEN GLASS
Filed Oct. 12, 1929   2 Sheets-Sheet 1
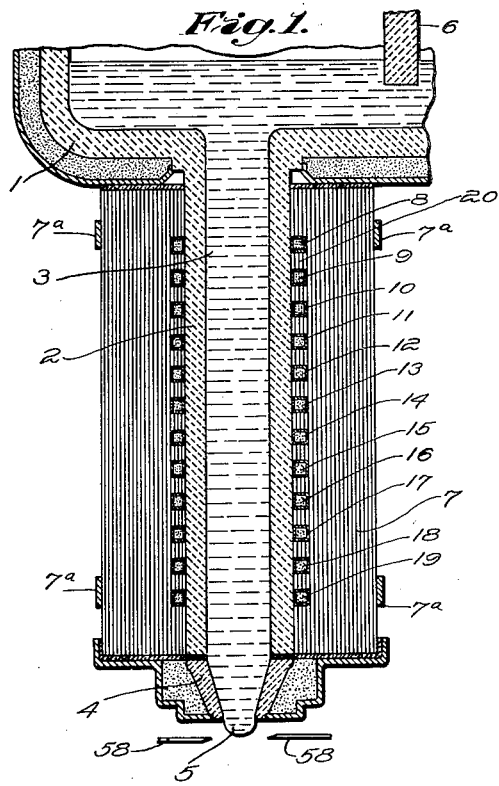
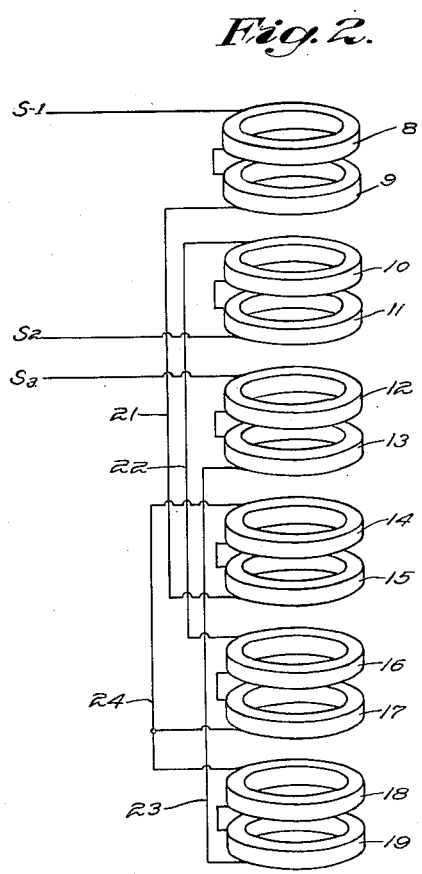
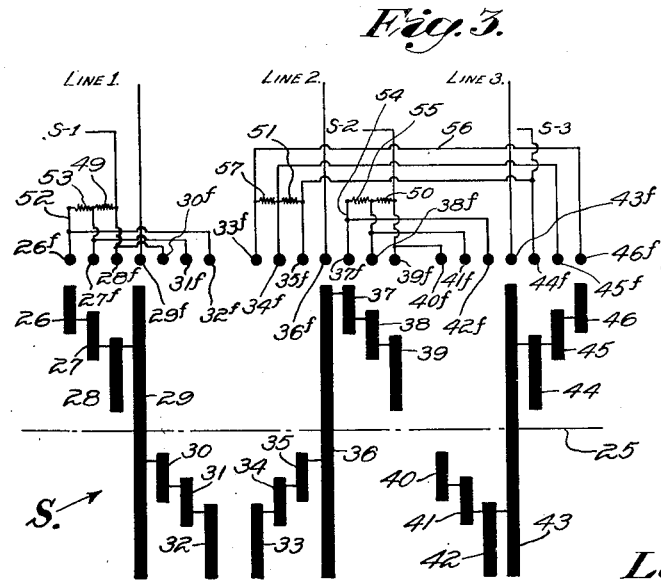
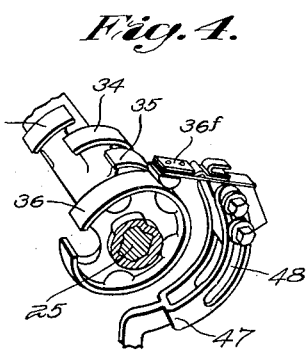
Witness;
W. B. Thayer
Inventors,
Lloyd G. Bates,
Frank E. Haskell,
by Brown & Carlsen
Attorneys.

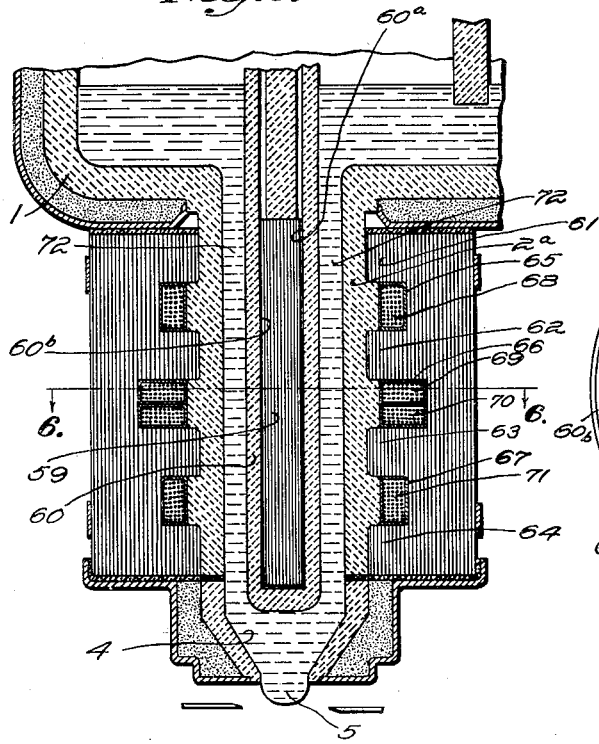
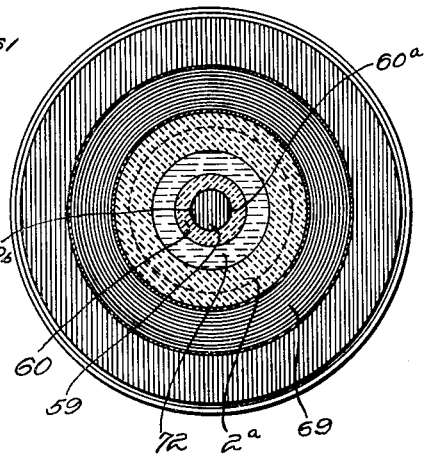

Patented Apr. 12. 1932                                          1,853,843

UNITED STATES PATENT OFFICE

LLOYD G. BATES, OF WEST HARTFORD, CONNECTICUT, AND FRANK E. HASKELL, OF HOLYOKE, MASSACHUSETTS, ASSIGNORS TO HARTFORD-EMPIRE COMPANY, OF HARTFORD, CONNECTICUT, A CORPORATION OF DELAWARE

APPARATUS FOR AND METHOD OF FEEDING MOLTEN GLASS

Application filed October 12, 1929. Serial No. 399,298.

This invention relates to a new method of and novel apparatus for controlling the flow of molten glass and more especially for controlling the flow of molten glass through a passage immediately adjacent to a feeder outlet, to control the delivery from the outlet of successive suspended mold charge masses of regulably controlled shape and of suitable condition to be advantageously used in glass shaping machines.

The invention involves the electro-dynamic control of the movement of glass by introducing a magnetic flux into the glass with the lines of force at substantially right angles to the direction of the desired mechanical force for producing accelerating or retarding movement of the glass and also producing a flow of electric current in the glass, which is conductive when molten, in a direction at right angles to both the magnetic lines of force and to the flow of electric current.

More specifically described, the invention involves the use of alternating current for the production of the magnetic flux and for the production of electric current flow in the molten glass by means of induction or transformer action from such flux. In order to obtain the desired mechanical reaction between the magnetic field or magnetic flux and the electric current flow in the molten glass, the lines of force are caused to shift or move along the glass in much the same manner as the magnetic flux shifts around the rotor of an induction motor, thereby producing electric currents which, in their reaction with the shifting or moving flux, tend to drag the glass along after the flux and move it along the passage. Such a shifting flux may be conveniently obtained by means of a polyphase winding. The term "polyphase" as used herein includes "split phase" or any arrangement of two or more circuits in which the currents are displaced in phase from one another.

It is one of the objects of the invention to control the feeding of molten glass through a feeder passage and orifice without requiring the use of any reciprocating plunger or other moving mechanical device within the passage, and without the use of means for applying superatmospheric and/or subatmospheric pressures to the glass in or adjacent to said passage or orifice.

It is also an object of the invention to maintain the desired force to either accelerate or retard the flow of glass for as long a time as desired regardless of the character and duration of the immediately preceding force.

In order to more clearly explain the invention, reference is made to the following description of specific embodiments thereof, taken in connection with the accompanying drawings, in which Figure 1 is a vertical section of a fragmentary portion of the forehearth of a glass tank having a discharge passage and a submerged orifice through which the flow of glass is controlled by means of a three phase distributed winding;

Fig. 2 is a diagrammatic perspective view of the component coils of the three-phase distributed winding of Fig. 1 displaced from the feeder;

Fig. 3 is a conventional diagrammatic view of one type of controller for applying to the glass the desired cyclic variations in accelerating and retarding forces;

Fig. 4 is a fragmentary perspective view, showing a portion of the controller of Fig. 3 and particularly illustrating a means for adjusting the contact fingers of the controller circumferentially about the axis of rotation of the controller;

Fig. 5 is a vertical section similar to Fig. 1 showing another form of winding in which the poles are concentrated and concentrated two-phase coils are employed instead of the distributed three-phase winding of Fig. 1;

Fig. 6 is a horizontal section substantially along the line 6—6 of Fig. 5.

Referring to the drawings more in detail, a forehearth 1 of a glass tank is provided with a downwardly extending discharge passage 2 of substantially circular section through which molten glass 3 flows to a discharge outlet 4 from which it is discharged in a series of preformed suspended mold charges, one of which is being formed as indicated at 5 in Fig. 1. The walls of the forehearth and of the passage 2 may be of any suitable refractory material, suitably insulated if desired. A vertically adjustable gate 6 or any other suitable known means may be provided to regulate the flow of glass to the discharge passage. In general the forehearth and its flow passage and outlet structure may be constructed in any suitable known manner.

Surrounding the wall of the discharge passage 2 is a magnetic field frame 7. This frame preferably is formed of laminated sheets, disposed with their planes extending vertically, and may be supported and held in place by suitable clamps 7a. The sheets are so assembled as to provide an opening or passage through the center of the same size as the outer dimension of the wall of the discharge passage. The arrangement is preferably such that the iron extends close to the refractory wall of the discharge passage, although heat insulating material may be placed between the refractory wall and the frame, and the refractory wall of the passage preferably is as thin as the requirements of the service for which it is intended will permit, so that the iron is positioned as close as possible to the glass within the passage.

The iron field frame is provided with a plurality of circumferentially extending grooves or annular slots within which are positioned windings or coils 8 to 19, inclusive. It will be noticed that between each pair of slots the iron extends close to the refractory in the form of an annular tooth 20. When current is supplied to a coil in one direction, such current tends to set up a magnetic flux which passes from one or more of the teeth above the coil in question into the glass and back into one or more of the teeth below the coil in question. By reversing the current in the coil the flux will be reversed; that is, it will pass into the glass below the coil and will return from the glass into the iron above the coil.

The connections of the annular coils may be as follows: The individual coils are grouped into so many coils per phase per pole. In the drawings, there is shown just one coil for each slot and the grouping is such that there are two coils per phase per pole. For convenience of description, the upper half of the winding will be considered as the winding for a north pole and the lower half of the winding will be considered as the winding for a south pole. It will be understood that this assumption is in accordance with the conventional explanation of the operation of a polyphase induction motor and it is to be also understood that in actual operation the portion of the winding which is for one instant a north pole changes into a south pole in one one-hundred-and-twentieth of a second (in a 60-cycle circuit) and then changes back again to a north pole and so on indefinitely. As clearly shown in Fig. 2, the two coils 8 and 9 which together constitute the phase A winding of the north pole are connected together in series; likewise coils 10 and 11 are connected in series and constitute the phase B winding of the north pole and also coils 12 and 13 are connected in series and constitute the phase C winding of the north pole. In a similar manner, coils 14 and 15 are connected in series to constitute the phase A winding of the south pole; coils 16 and 17 are connected in series to constitute the phase B winding of the south pole; and coils 18 and 19 are connected in series to constitute the phase C winding of the south pole.

The phase A winding of the north pole and the phase A winding of the south pole are connected in series, as by the conductor 21, the lower lead of the north pole set of coils being connected in series with the lower lead of the south pole set of coils so that the current flows in opposite directions in the upper set of coils and the lower set of coils and sets up opposite polarities of magnetic flux into the glass. In a similar manner the phase B coils of the north pole and the south pole are connected in series, as by a conductor 22, to produce fluxes in opposite directions and also the phase C coils of the north pole are connected in series, as by a conductor 23, with the phase C coils of the south pole.

In connecting the coils to a supply circuit the upper lead of phase A is extended, as indicated at $S^1$, for connection to a three-phase circuit controller or switch, generally indicated at S, the upper lead of phase C is extended, as at $S^3$, for a second connection with the controller or switch, and the lower end of phase B is extended, as at $S^2$, for a third connection with the controller or switch. The remaining leads of phases A, B and C are connected together by the wires indicated at 24 to constitute the usual Y-connection or star connection. It will be understood that if desired various modifications of the winding connections may be employed, such as delta connections instead of Y-connections and the coils of separate phases may be connected in parallel instead of in series or they may be connected partly in series and partly in parallel.

The controller or switch S may be somewhat similar to the drum type of controller used for electric street cars, or for convenience of description it may be said to be generally similar to a motor driven flasher for an electric sign. The controller has a shaft 25 driven by an electric motor or other source of power at a certain regulable speed, either continuously or intermittently as desired, and has mounted thereon a plurality of contact segments 26 to 46, inclusive. Suitably mounted on a stationary part of the apparatus are a plurality of contact fingers 26f to 46f inclusive, one for each contact segment. As shown in Fig. 4, each of these fingers may be adjustably secured to an arcuate arm 47 having an arcuate slot 48 which permits each finger to be moved a certain distance circumferentially of the axis of the shaft 25, so that the time at which it starts to make contact or ceases to make contact with its associate segment may be changed.

The connections may be substantially as follows: The contact finger 29$f$ makes contact with its ring or segment 29 which extends around nearly the whole circumference of the controller. This contact finger 29$f$ is supplied with current through a conductor, designated "Line 1" from a terminal of a three-phase supply circuit. The construction is similar whereby a second terminal of the three-phase supply circuit is connected through a conductor, designated "Line 2" to the finger 36$f$ which makes contact with the contact ring or segment 36. A third terminal of the three-phase supply circuit is connected by means of a conductor, designated "Line 3", to the contact finger 43$f$ which makes contact with the ring or segment 43. The contact ring or segment 29 has the segments 26, 27 and 28 connected therewith for respectively and successively making contact with the contact fingers 26$f$, 27$f$, and 28$f$ during each cycle of rotation of the controller shaft. Similarly, the contact segment 36 has connected therewith the three segments 37, 38, and 39 for making contact respectively and successively with the three contact fingers 37$f$, 38$f$, and 39$f$ and the contact segment 43 has connected therewith the three segments 46, 45, and 44 for making contact respectively and successively with the three fingers 46$f$, 45$f$, and 44$f$.

The segment 29 also has connected therewith the three contact segments 30, 31, and 32 which make contact respectively and successively with the contact fingers 30$f$, 31$f$, and 32$f$ during each cycle of rotation of the controller shaft. Contact segment 36 also has connected therewith the three contact segments 35, 34, and 33 for making contact with the fingers 35$f$, 34$f$ and 33$f$ and the segment 43 has the three segments 40, 41, and 42 connected therewith for making contact with the fingers 40$f$, 41$f$, and 42$f$. The contact fingers 28$f$ and 30$f$ are connected together and to the conductor S′ which leads to one terminal of the winding around the discharge passage; the contact fingers 39$f$ and 40$f$ are also connected together and to the conductor S² which is connected with a second terminal of the winding; and contact fingers 35$f$ and 44$f$ are connected together and to the conductor S³ which leads to the third terminal of the winding.

The two fingers 27$f$ and 31$f$ are connected together and to one terminal of a resistance 49, the other terminal of which is connected to the conductor S′. In a similar manner, the fingers 38$f$ and 41$f$ are connected together and to one terminal of a resistance 50, the other terminal of which is connected to conductor S². The two fingers 34$f$ and 45$f$ are likewise connected to one terminal of a resistance 51, the other terminal of which is connected to the conductor S³. The two fingers 26$f$ and 32$f$ are connected to a conductor 52 leading to one terminal of a resistance 53, the other terminal of the resistance being connected through the resistance 49 to the conductor S′. In a similar manner, the fingers 37$f$ and 42$f$ are connected to a conductor 54 which leads to one terminal of a resistance 55, the other terminal of which is connected through the resistance 50 with the conductor S². Also, the two fingers 33$f$ and 46$f$ are connected by a conductor 56 with each other and to one terminal of a resistance 57, the other terminal of which is connected through the resistance 57 to the conductor S³.

The operation of the electric coils in producing magnetic flux, electric currents in the glass, and mechanical movement of the glass will be first explained without reference to the more or less complete regulation of such movement that is obtainable by means of the controller shown in Fig. 3. Assuming that the terminals $S_1$, $S_2$ and $S_3$ of Fig. 2 have been connected to a three-phase source of supply, the progressive movement of the maximum current from coil to coil and the resultant progressive movement of the flux from the top coil to the bottom coil may be readily understood. If the current in coils 8 and 9 reaches a maximum first, then the next coils in which the current reaches a maximum would be the coils 10 and 11 at one-sixth of a cycle later (two-thirds of a cycle minus one-half of a cycle because this coil is connected in a reverse direction). Following this, the current in coils 12 and 13 will reach a maximum one-third of a cycle after the current in coils 8 and 9 or one-sixth of a cycle after the current reaches a maximum in coils 10 and 11. Following this, the current in coils 14 and 15 reaches a maximum one-sixth of a cycle later than the current in coils 12 and 13 or one-half of a cycle later than the current in coils 8 and 9. The current in coils 16 and 17 reaches a maximum one-sixth of a cycle after the current in coils 14 and 15 reaches a maximum and finally the current in coils 18 and 19 reaches a maximum one-sixth of a cycle later than the current in coils 16 and 17. The flux produced by the coils extends radially into or out of the glass and because of the shifting of the flux downward as the maximum current producing the flux shifts downward, there will be set up in the glass, which is conductive when molten, currents, the general direction of which is annular (parallel to the flow of the current in the coils producing such currents). The interaction between the flux and the currents produced in the glass is such that the mechanical force set up between the field and the current carrying glass is in such a direction that the glass is dragged along in the same direction as the shifting of the magnetic field. This is analogous to the dragging of the rotor of an induction motor around after the rotating magnetic field. In fact, the action can accurately be described as being analogous to that of a linear electric motor rather than a rotating electric motor.

A brief summary will also be given of two purposes accomplished by the use of the controller of Fig. 3 before proceeding with a more detailed description of the operation of the controller itself. The intensity of the mechanical force can be regulated by regulating the currents passing into the coils and one convenient way of so doing is to insert resistance in the conductors through which the current passes to the windings. The controller shown does this by the step by step method. The direction of the shifting can be changed from the downward to the upward direction by reversing any two terminals supplying current to the coils. This is precisely analogous to the method of reversing the direction of rotation of an induction motor by reversing any two line terminals. In the controller shown in Fig. 3, the contacts above the center line 25 are reversed, as to "Line 1" and "Line 2" from the contacts shown below the center line 25.

The operation of the controller and of the parts which are controlled thereby will now be briefly described. The connections and flow of current will not be traced in detail as it is believed that the description herein and the drawings will render such details obvious to those skilled in the art. The three-phase supply circuit is connected with the terminals of the feeder windings through the three double resistances 53—49, 55—50 and 57—51 in the first contact position, that is, with the contact fingers 26$f$, 37$f$, and 46$f$, in contact with the segments 26, 37, and 46, respectively, and the contact fingers 29$f$, 36$f$, and 43$f$ in contact with the relatively long or main segments 29, 36, and 43, respectively. This will produce a force tending to move the glass downwardly in the passage 2. This dynamic force may be relatively weak initially because the entire resistance available in the particular embodiment of the invention illustrated is connected in the circuit. When the second controller position is reached and the fingers 27$f$, 38$f$, and 45$f$ make contact with the segments 27, 38, and 45, the current is supplied to the electro-dynamic feeder through the respective resistances 49, 50, and 51 only and the current is therefore larger and the downwardly exerted mechanical force acting on the glass is greater. In the third position, the contact fingers 28$f$, 39$f$, and 44$f$ make contact with the segments 28, 39, and 44 and the current flows directly from the supply circuit to the feeder windings and the downwardly exerted mechanical force on the glass in the passage 2 is at a maximum. The discharge accelerating force thus may have a maximum intensity or strength during the latter part of the flow accelerating period.

After the three segments 28, 39, and 44 leave their respective fingers 28$f$, 39$f$, and 44$f$, there may be a period in the cycle of the controller during which there is no electrodynamic action exerted upon the glass.

In the next closed position of the controller or switch, the full current flow may take place as the segments 30, 40, and 35 contact with the fingers 30$f$, 40$f$, and 35$f$, but it will be noted that line wires "Line 2", "Line 3" are now connected to feeder wires $S^3$ and $S^2$, respectively, or reversed from the connections which obtained during the first three closed positions of the controller. The resultant dynamic force on the glass in the passage therefore will be reversed and now will be exerted in an upward direction and with maximum strength. In the next closed position of the controller, the first sections 49, 50, and 51 of the resistances are inserted in the feeder lines as the segments 31, 41, and 34 contact with the fingers 31$f$, 41$f$, and 34$f$, and the fingers 30$f$, 40$f$, and 35$f$, leave their respective segments 30, 40, and 35, and therefore the upwardly exerted dynamic force on the glass in the passage 2 may be somewhat less than initially. Finally the whole resistance is inserted in the feeder lines as the segments 32, 42, and 33 contact with their respective fingers 32$f$, 42$f$, and 33$f$, and the fingers 31$f$, 41$f$, and 34$f$, leave their respective segments 31, 41, and 34, so that the glass flow retarding force will be reduced to a minimum. After the segments 32, 42 and 33 leave their respective fingers 32$f$, 42$f$, and 33$f$, there may be a period of unmodified gravity flow while the controller is open until the segments 26, 37, and 46 again make contact with their associated fingers to initiate the period of glass discharge acceleration of a new cycle of glass feeding operations.

A cycle of operations to produce a preformed mold charge by the use of the feeder equipped with the invention will now be described.

According to the showing in Fig. 1 with the controller in the position shown in Fig. 3, the molten glass is being discharged by gravity alone into suspension below the discharge outlet 4, as indicated at 5 in Fig. 1, and the controller switch is open. After the period of unmodified gravity flow, the controller switch moves to its first closed position, as above described, to initiate a period of acceleration of discharge of glass from the outlet. The electro-dynamic force exerted downwardly in the glass in the flow passage to cause such acceleration may increase gradually as resistance is removed from the feeder lines to compensate for the increasing tendency of the glass in suspension below the outlet to attenuate or thin out and to aid in preshaping the accumulating suspended mass. After a flow accelerating period of regulable duration, the second open position of the controller switch will be reached to permit a further period of unmodified gravity flow during which the upper portion of the suspended mass of glass below the outlet may start to attenuate. This second period of unmodified gravity flow may be relatively short or may be entirely omitted and the flow retarding, stopping or reversing electro-dynamic action may be commenced immediately after the termination of the flow accelerating action. The electro-dynamic flow retarding, stopping or reversing force may be relatively strong initially because of the cutting out of the resistances from the feeder lines, and may be gradually decreased. Immediately before, at, or after the inception of the period of retardation, stoppage or reversal of glass discharge from the outlet, the shear blades 58 may be closed to sever the suspended mold charge from the glass at the outlet. Any suitable known severing mechanism or means may be employed.

The upwardly exerted electro-dynamic force then may retract the glass stub into the outlet during the initial part of the glass flow retarding period or may otherwise control the movement or position of such stub with respect to the outlet as required to assure adequate reheating and reassimilation by the oncoming glass of any portion of the glass stub which may have been chilled during the shearing operation. The flow retarding effect of the upwardly exerted electro-dynamic force will decrease so as to permit a gradually increased gravity flow during the second series of closed positions of the controller and at the end of the period of flow-retarding electro-dynamic force, the controller will be open to permit a new period of unmodified gravity flow. This will initiate a new cycle of operations for the formation of a mold charge.

The contact fingers of the controller may be independently adjusted circumferentially of the axis of the rotation of the controller to vary the times of occurrence and durations of the flow accelerating and flow retarding electro-dynamic force and also the periods of dwell or unmodified gravity flow in a cycle of operations for the formation of the mold charge, thereby permitting regulable control of the shape of the mold charge that is to be obtained to suit a mold cavity of any one of a wide variety of shapes. This adjustment of the contact fingers also may be utilized to vary the character of the change of strength of the flow accelerating electro-dynamic force and of the flow retarding electro-dynamic force. Further adjustments of the effective flow retarding and flow regulating electro-dynamic forces may be made by varying the resistances in the several feeder lines.

The glass in the flow passage will be heated electro-thermally as the electro-dynamic forces are produced and during the periods of application of such electro-dynamic forces to the glass. In general, such electro-thermal action in the glass will be varied as the electro-dynamic forces are varied. The relation between the mechanical or electro-dynamic force and the electro-thermal heating may be regulated by changing the frequency of the alternating current. For example, the electric current in the glass may be held constant by increasing the frequency and decreasing the flux; in which case, the mechanical force would be reduced, or by decreasing the frequency and increasing the flux, with a consequent increase of mechanical force.

Greater electric currents may be induced in the glass by higher frequencies and with very high frequencies, the iron of the magnetic path may be dispensed with and the principle of the air-core type of transformer employed.

In the form of apparatus shown in Figs. 5 and 6, an iron core 59 surrounded by a refractory protective casing 60 is positioned within the passage 2a through which the molten glass flows from the forehearth 1 and from which it is discharged. This core preferably is of laminated iron and there may be provided ducts 60a and 60b through which suitable cooling fluid may be passed if required to keep the temperature of the iron below certain limits. The field structure is somewhat different from that of the construction of Fig. 1. Instead of annular teeth, annular poles 61, 62, 63, and 64 are provided and instead of the relatively small slots between the teeth, there are employed relatively large winding spaces 65, 66, and 67 in which are positioned concentrated windings or large coils 68, 69, and 70, and 71 instead of the distributed windings shown in Fig. 1. This form of apparatus is adapted as shown for a two-phase electric supply circuit. In the winding space 65, the coil 68 is adapted for connection to phase A and acts to produce a north pole flux in the pole 61, the lines of force passing through the annular body 72 of glass and into the iron core 59. The coil 70 in the winding space 66 is connected to phase A so as to produce a south pole flux from the iron core 59 through the annular body of glass and into the pole 63. It will be seen that the complete closed circuit of the phase A flux is out of the north pole 61 into the core 59, longitudinally along the core 59 then outward to the south pole 63 into which the lines pass from the core and thence through the iron field structure to the north pole 61. In a similar manner, the phase B coil 69 is placed in the winding space 66 to produce a phase B north pole flux in the pole 62 and the phase B coil 71 is placed in the winding space 67 to produce a south pole flux in the pole 64.

This structure may be considered as somewhat analogous to that of a certain type of small induction motor having definite pole pieces rather than a distributed winding, usually a split-phase type of single phase motor. The differences between the form of apparatus shown in Fig. 1 and that shown in Figs. 5 and 6 are chiefly structural, the principles of operation being so similar that no repetition of the description of operations for controlling the delivery of molten glass from the discharge outlet to produce suspended mold charge masses of regulably controlled predetermined shape is considered necessary. The controller used with the construction of Figs. 5 and 6 may be similar to that shown in Fig. 3 with the necessary changes to adapt it to two-phase operation. It is believed to be within the skill of one skilled in the art to make such changes.

The various features of apparatus of the invention may be modified as to structure, combination, and arrangement, and the various steps of the method of the invention likewise may be modified to meet various conditions of service and different requirements of use without departing from the spirit and scope of the invention as set out in the appended claims.

In the present application, we have disclosed, and the more specific claims are directed to, methods and apparatus whereby the electric current which coacts with the magnetic flux to produce the desired electrodynamic force in the glass is produced in the glass entirely by induction, while in our co-pending application, Serial No. 399,297, filed October 12, 1929, electric current is introduced into the glass conductively.

We claim:

1. The method of applying mechanical force tending to move molten glass comprising setting up a magnetic field with the lines of force extending into the glass at substantially right angles to the direction of the desired mechanical force and producing entirely by induction a flow of electric current in the glass at substantially right angles to both the lines of magnetic force and the direction of the desired mechanical force.

2. The method of controlling the discharge of glass from a glass feeder orifice comprising setting up a magnetic field in which the lines of force extend into the glass at substantially right angles to the direction of movement of the glass to said orifice, producing entirely by induction a flow of current in the glass at substantially right angles to both the magnetic lines of force and the direction of movement of the glass, whereby mechanical forces are set up in the glass substantially in line with the orifice, and periodically varying the value of said mechanical forces to aid in controlling the formation of mold charges of glass discharged from the orifice.

3. The method of controlling the flow of glass from a glass feeder orifice comprising setting up a magnetic field in which the lines of force extend into the glass at substantially right angles to the direction of movement of the glass to said orifice, producing entirely by induction a flow of current in the glass at substantially right angles to both the magnetic lines of force and the movement of the glass, whereby mechanical forces are set up in the glass in the direction of movement of the glass for accelerating discharge of glass from the orifice, periodically varying the value of said mechanical forces to aid in controlling the formation of mold charges of glass discharged from the orifice and severing said mold charges when formed from the glass at the feeder orifice.

4. The method of feeding molten glass in mold charges which comprises passing glass through a flow passage to a submerged discharge outlet, periodically accelerating the flow of glass through said outlet by setting up a magnetic field in which the lines of force extend into the glass in the flow passage substantially at right angles to the direction of the flow of said glass and producing entirely by induction a flow of electric current in said glass substantially at right angles to both the magnetic lines of force and the direction of flow of the glass to aid in controlling the shape of successive masses of discharged glass in suspension below the outlet, and periodically severing mold charges from said suspended mold charge masses.

5. The method of feeding molten glass in mold charges which comprises flowing molten glass through a discharge passage to a submerged discharge outlet, periodically setting up a magnetic field having lines of force extending into the glass in said passage substantially at right angles to the direction of flow of the glass and producing entirely by induction a flow of electric current in the glass substantially at right angles with both the magnetic lines of force and the direction of flow of the glass to periodically retard discharge of glass from the outlet for aiding in controlling the shape of successive masses of discharged glass in suspension below the outlet, and periodically severing mold charges from said suspended mold charge masses.

6. The method of feeding molten glass in mold charges which comprises flowing glass by gravity through a discharge passage to a submerged discharge outlet, periodically introducing magnetic flux into the glass in said passage substantially at right angles with the direction of flow of the glass and producing entirely by induction an electric current in said glass substantially at right angles with both said magnetic flux and with the direction of flow of the glass to alter the rate of flow of glass through the outlet and thereby to aid in controlling the formation of successive mold charge masses in suspension below the outlet and periodically severing mold charges from said suspended masses.

7. The method of feeding molten glass in mold charges which comprises flowing glass by gravity through a discharge passage to a submerged discharge outlet, introducing a magnetic flux into the glass in said passages substantially at right angles with the direction of flow of the glass and alternately shifting said flux in opposite directions along said passage periodically to accelerate and periodically to retard the flow of glass from said outlet, and periodically severing mold charges from the glass discharged through said outlet.

8. In glass feeding apparatus, a container for molten glass having a glass discharge passage terminating in a submerged discharge outlet, means for introducing a magnetic flux into said glass in the passage substantially at right angles with the direction of flow of the glass therein, and means for shifting said flux longitudinally of the passage to induce electric currents in said glass reacting with said flux to alter the rate of discharge of glass through said outlet.

9. In glass feeding apparatus, a container for molten glass having a flow passage terminating in a submerged discharge outlet, means for producing magnetic flux in the glass in said flow passage substantially at right angles with the direction of flow therein, and means for periodically shifting said magnetic flux along said flow passage toward said outlet to induce electric currents in the glass reacting with said magnetic flux to accelerate discharge of glass through the outlet.

10. In glass feeding apparatus, a container for molten glass having a flow passage terminating in a submerged discharge outlet, means for producing magnetic flux in the glass in said flow passage substantially at right angles with the direction of flow therein, and means for shifting said magnetic flux along said flow passage away from the outlet to induce electric currents in the glass reacting with said magnetic flux to retard discharge of glass through the outlet.

11. Apparatus for feeding molten glass in mold charges comprising a container for the glass having a flow passage terminating in a submerged discharge outlet, means for introducing a magnetic flux into the glass in said passage substantially at right angles with the direction of flow of the glass therein, means for periodically and alternately shifting said flux longitudinally of said passage toward and from said outlet to induce electric currents in said glass reacting with said flux periodically to accelerate and periodically to retard discharge of glass from said outlet, and means for independently timing the shifting of said flux in each of said directions along the passage to aid in regulably controlling the shape of mold charge masses of discharged glass below the outlet.

12. Apparatus for feeding molten glass in mold charges comprising a container for the glass having a flow passage terminating in a submerged discharge outlet, means for introducing a magnetic flux into the glass in said passage substantially at right angles with the direction of flow of the glass therein, means for periodically and alternately shifting said flux longitudinally of said passage toward and from said outlet to induce electric currents in said glass reacting with said flux periodically to accelerate and periodically to retard discharge of glass from said outlet, and means for independently regulating the duration of the periods of acceleration and retardation of said discharge of glass to aid in regulably controlling the shape of mold charge masses of discharged glass below the outlet.

13. Glass feeding apparatus comprising a container for molten glass having a flow passage terminating in a submerged outlet, means for introducing a magnetic flux into the glass substantially at right angles with the direction of flow of glass in said passage, means for shifting said flux along said passage toward said outlet to induce an electric current in said glass reacting with the flux to accelerate discharge of glass through said outlet, means controlling the induction of said electric current periodically to vary said current and the effective accelerating force, means for shifting said flux away from said outlet to induce electric currents in the glass reacting with the flux to retard discharge of glass from the outlet, means for controlling the induction of said last named currents to vary said currents and the consequent retarding force, and means for periodically severing mold charges from the glass discharged from said outlet.

14. Glass feeding apparatus comprising a container for molten glass having a flow passage terminating in a flow discharge outlet, polyphase windings surrounding said flow passage and the glass therein, connections from a source of polyphase current to said windings for introducing a magnetic flux into the glass in said passage and for shifting said flux along said passage to induce electric currents in the glass therein, reacting with said flux to set up an electro-dynamic force tending to move said glass in one direction along said passage, and means for reversing the connections between said polyphase circuit and said windings to reverse the direction of shifting of said magnetic flux along the passage and the direction of the resultant electro-dynamic force on the glass in said passage.

15. In combination, a container for molten glass having a submerged discharge outlet, electro-magnetic means for introducing a magnetic flux into the glass adjacent to said discharge passage and for inducing an electric current in said glass in such relation with respect to each other and to the direction of movement of glass to said discharge outlet as to set up an electro-dynamic force in the glass for influencing the rate of movement of glass through the outlet and for producing an electro-thermal action on said glass.

16. Glass feeding apparatus comprising a container having a flow passage for molten glass, polyphase windings surrounding said flow passage, connections between said polyphase windings and a source of polyphase current for inducing electric currents in said glass to produce an electro-thermal action therein and simultaneously to set up a dynamic force tending to move the glass longitudinally of the passage.

17. Glass feeding apparatus comprising a container having a flow passage for molten glass, polyphase windings surrounding said flow passage, connections between said polyphase windings and a source of polyphase current for inducing electric currents in said glass to produce an electro-thermal action therein and simultaneously to set up a dynamic force tending to move the glass longitudinally of the passage, and means for varying said electric current to vary said electrothermal action and said electric dynamic force.

18. Glass feeding apparatus comprising a container for molten glass having a flow passage leading to a submerged discharge outlet, and means for controlling the flow of glass along said passage, comprising polyphase windings surrounding said flow passage and spaced therealong, means including an automatic variable resistance controller for periodically making and breaking electrical circuits between said polyphase windings and a source of polyphase current a plurality of times in each cycle of said controller and for reversing the connections between said source and said windings in each cycle and means for adjusting said controller variably to time said reversals of connections.

19. The method of conditioning and controlling the rate of discharge of molten glass from a submerged discharge outlet of a glass container, comprising introducing an alternating-current flux into the glass adjacent to said outlet and substantially at right angles with the axial line of said outlet for inducing currents in the glass for heating the glass and reacting with the flux to set up a dynamic force tending to move the glass axially of the outlet, and changing the frequency of the alternating current to change the relation between the heating and dynamic actions of the induced current on the glass.

20. The method of controlling movement of molten glass comprising introducing a magnetic field into the glass at substantially right angles to the direction of the desired movement and shifting said field longitudinally of the direction of said movement.

21. The method of controlling movement of molten glass comprising introducing a polyphase magnetic field into said glass so that the lines of force extend into the glass at substantially right angles to the direction of the desired movement, whereby the changing of the polyphase current produces a shifting of the field longitudinally of said direction of movement.

22. The method of electro-dynamically accelerating and retarding the movement of molten glass through a flow passage comprising setting up a magnetic field at substantially right angles to the direction of movement of glass in said passage, shifting said field in one direction along said passage to produce a force for accelerating the movement of the glass in said passage, and shifting the field in the opposite direction along said passage to retard the movement of said glass.

23. The method of producing longitudinal movement of a conductive body comprising introducing a magnetic field into the body at substantially right angles to the direction of the desired movement and shifting said field longitudinally of the direction of said movement.

24. The method of controlling the flow of a conductive fluid comprising introducing a magnetic field into the fluid at substantially right angles to the direction of the desired flow and shifting said field longitudinally of the direction of said flow.

25. The method of controlling the longitudinal movement of a conductive fluid in an annular passage comprising introducing a magnetic field into the fluid in which the lines of force pass from outside of the annular passage through the fluid into the interior of said annular space and shifting said field longitudinally of said fluid to drag the fluid after the flux by virtue of the current induced therein.

26. The method of controlling the flow of a conductive fluid along a passage comprising introducing into the fluid a plurality of magnetic fluxes of different phases in which the lines of force extend into said fluid at right angles to the direction of movement of the fluid and the different phases are positioned successively at different places spaced in a longitudinal direction along the passage whereby the changing values of the alternating currents in the different phases produce a flux which shifts longitudinally of the passage and induces electric currents in the fluid which tend to move it in the same direction.

27. Apparatus for producing linear motion comprising a substantially cylindrical passage, an electrically conductive body of circular cross-sectional configuration in said passage, a magnetic field with lines of force extending substantially radially and symmetrically into said body, and means for shifting said field longitudinally of said passage.

28. Apparatus for producing linear motion of a conductive fluid comprising a substantially cylindrical passage for said fluid, a magnetic field with lines of force extending substantially radially and symmetrically into said body, and means for shifting said field longitudinally of said passage.

29. Apparatus for producing linear motion of a conductive fluid comprising a substantially cylindrical passage for said fluid, a plurality of annular coils positioned around said passage, and connections between said coils and a polyphase electric supply circuit, the phases of said circuit being so connected to the coils as to produce a longitudinally shifting magnetic field.

Signed at Hartford, Connecticut, this 9th day of October, 1929.

LLOYD G. BATES.
FRANK E. HASKELL.